United States Patent [19]

Dolan et al.

[11] Patent Number: 4,819,585
[45] Date of Patent: Apr. 11, 1989

[54] FREEZE RESISTANT ADJUSTABLE FLOW RATE ANIMAL NIPPLE WATERER

[76] Inventors: Roger Dolan, 411 E. Market, Lisbon, Iowa 52253; Clifford Streed, 711 Meadow Lane Ct., Mount Vernon, Iowa 52314

[21] Appl. No.: 3,806

[22] Filed: Jan. 16, 1987

[51] Int. Cl.⁴ ............................................... A01K 7/00
[52] U.S. Cl. ...................................... 119/72.5; 119/73
[58] Field of Search .................... 119/72.5, 75, 72, 73

[56] References Cited

U.S. PATENT DOCUMENTS

| | | | |
|---|---|---|---|
| 3,750,628 | 8/1973 | Schumacher | 119/72.5 |
| 3,995,596 | 12/1976 | Andersson | 119/72.5 |
| 4,391,225 | 7/1983 | Sparks | 119/72.5 |
| 4,403,570 | 9/1983 | Freehafer | 119/72.5 |

FOREIGN PATENT DOCUMENTS

| | | | |
|---|---|---|---|
| 3506258 | 8/1986 | Fed. Rep. of Germany | 119/75 |
| 1332134 | 10/1973 | United Kingdom | 119/72.5 |

*Primary Examiner*—John J. Wilson
*Attorney, Agent, or Firm*—Robert C. Mayes; Gregory G. Williams

[57] ABSTRACT

A nipple type animal watering device is disclosed having an adjustable flowrate, and freeze protection. The flow is adjusted by a screwdriver depression and turning the trigger and without removing or disassembling the nipple. The freeze protection is due to the nipple/-trigger relationship and the selection of materials for the nipple and valve body such that a warmer valvebody is easier to maintain.

12 Claims, 2 Drawing Sheets

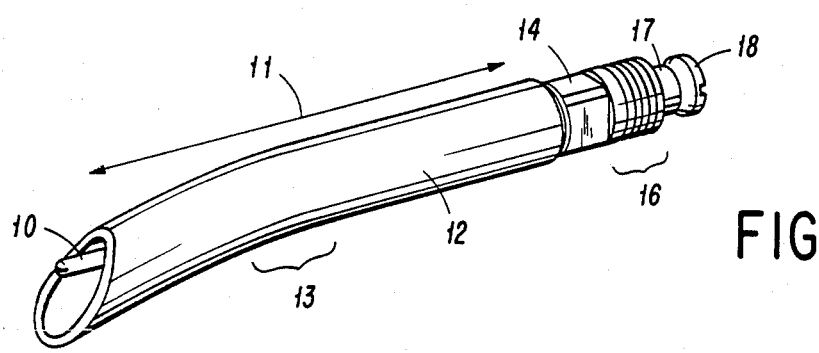
FIG 1
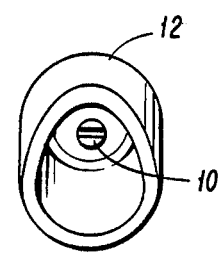
FIG 2a
FIG 2b
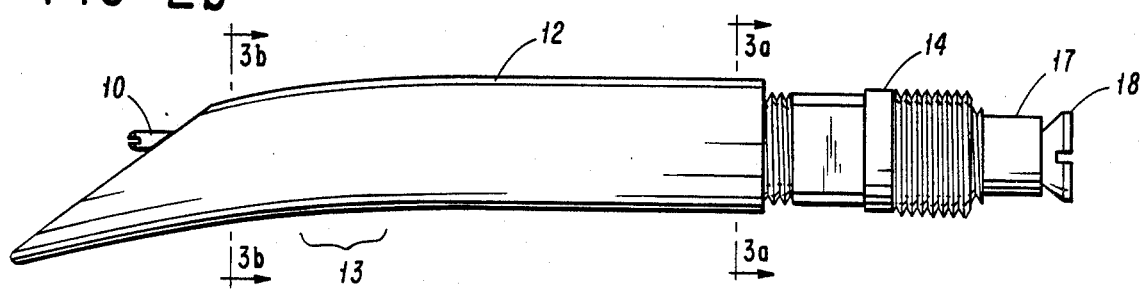
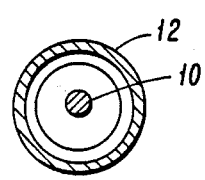
FIG 3a
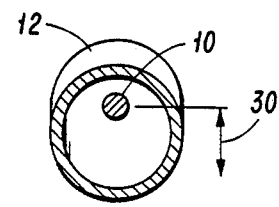
FIG 3b
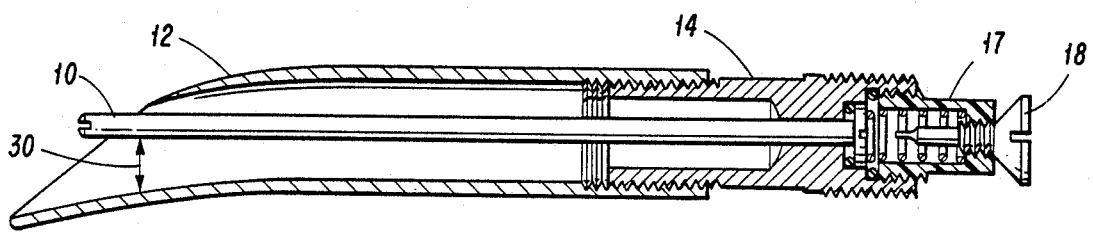
FIG 4a

FREEZE RESISTANT ADJUSTABLE FLOW RATE ANIMAL NIPPLE WATERER

BACKGROUND OF THE INVENTION

The present invention generally relates to animal watering systems and, more particularly, is concerned with an apparatus for dispensing water to animals in which the flow rate is adjustable from the nipple and, even more particularly, relates to such apparatusses which are especially suited for operation in sub-freezing temperatures.

The ability of a stockman to provide an ever present source of fresh water for consumption by his animals can be crucial to his entire operation. Not surprisingly, the demands placed upon a typical animal waterer in certain climates can be quite diverse. In the heat of summer, livestock usually require more water per animal per day than they do when the temperature plunges below 0° F. in mid-winter. Today, animal waterers are expected to function and be adjustable to meet such divergent uses. Moreover, a plethora of other factors influence the amount of water needed by any particular animal of at any given time, such as the species, age, weight and health of the animal and in some cases the amount of water available to the animal can be a critical factor in the animals care. Therefore, it is quite desireable for a waterer to be easily adjustable, by the stockman yet not be subject to inadvertent disturbances arising by normal use.

One type of nipple waterers that is in present use is described and illustrated in U.S. Pat. No. 4,391,225 issued to Jacob D. Sparks which is incorporated herein by this reference. The Sparks patent discloses a nipple waterer that employs a single unit linear type valve body with a valve stem having a cut away portion at its nipple end. While this system or variations of it have been used in the past, it does have numerous serious drawbacks. One major problem found therein and throughout the prior art is the adjustability of fluid flow rate. The flow rate in a Sparks type waterer can be disturbed by merely turning the valve stem and it in such designs the animal itself may inadvertently alter the flow rate in normal use. Other valves in use regulate the flow rate by interchangeable orifices or other internally adjusted valves. These are undesireable because the difficulty in making adjustments is often significant which can make cleaning or flushing of the waterer difficult. Another major problem replete in the prior art is the tendency for the waterers to freeze up in cold weather. The single unit valve body design in a Sparks type waterer allows for unwanted heat transfer to occur by providing an uninterrupted heat conduction path to exist from the relatively warm water source, to the colder nipple tip in the frigid air. During subfreezing temperatures heat will be conducted away from the narrow openings inside the valve where freezing commonly occurs. Another problem area with such a design is caused when a drop of water forms and freezes at the nipple tip of the valve stem and increases in size until it spans the gap to the bottom of the valve body. Freezing of such a situated water can also cause the waterer to fail to operate. By gradually building up, causing the trigger to be pressed upward until water is released.

Consequently, a need exists for improvements in nipple waterers which will result in:

(1) increased ease in making flow rate adjustments while concomitantly not increasing the likelihood of inadvertent alterations in flow rate by normal use;
(2) increased ease in cleaning or flushing the waterer; and,
(3) decrease the failures resulting from freeze ups in cold weather operation.

SUMMARY OF THE INVENTION

It is an object of this invention to provide a waterer with an easily adjusted flow rate without dismounting or disassembling the waterer.

It is a feature of this invention to include a slotted trigger disposed within the nipple which selectively engages and manipulates an internal flow regulating screw.

It is an advantage of this invention to allow flow rate adjustments to be made at the nipple tip while not permitting inadvertent alterations to occur in normal use.

It is an object of this invention to provide a waterer which operates in subfreezing temperatures.

It is yet another feature of this invention to utilize a multipart and multi material nonlinear valve body.

It is an advantage of this invention to inhibit the heat conduction away from the narrow fluid passages within the waterer and to increase the distance from the trigger tip to the bottom of the nipple while not increasing the overall circumference of the nipple.

The present invention provides a nipple waterer designed to satisfy the aforementioned needs, provide the previously propounded objects, include the above described features and to achieve the earlier articulated advantages. Animal watering is carried out by a nipple waterer with the capability for easy nipple tip flow rate adjustments in an "accident less" design in the sense that the flow rate can be adjusted by rotating the trigger at the nipple end but not without first depressing the trigger backwards fully and causing it to mesh with the internal flow regulating screw. The nipple waterer of this invention is "freeze resistent" in the sense that the heat conduction away from the interior narrow water passages is inhibited and the critical distance between the trigger tip and the nipple bottom is increased.

Accordingly, the present invention relates to an animal nipple waterer which includes; in one embodiment, a multipart and multimaterial valve body and nipple combination together with a trigger selectively engaging a flow regulating screw; and in another embodiment, a nonlinear valve body and nipple combination together with a trigger selectively engaging a flow regulating screw.

BRIEF DESCRIPTION OF THE DRAWINGS

FIG. 1 is a perspective view of the nipple waterer of this invention.

FIG. 2A is a front view of the waterer of FIG. 1.

FIG. 2B is a side view of the waterer of this invention.

FIG. 3A is a cross sectional view of the waterer taken on line 3A-3A' of FIG. 2B.

FIG. 3B is a cross sectional view of the waterer taken on line 3B-3B' of FIG. 2B.

FIG. 4A is a cross sectional view of the waterer of this invention.

DETAILED DESCRIPTION

Figure 4B:
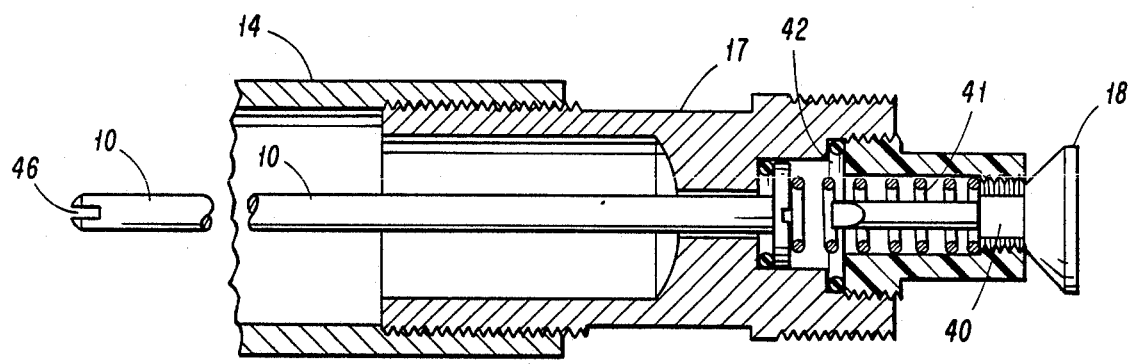
FIG. 4B is an enlarged portion of the cross sectional view of the moving parts of the waterer of FIG. 4A together with an instrumentality for moving such parts.

Now referring to the drawings, and more particularly to FIG. 1, there is shown a preferred embodiment of a nipple waterer of this invention, which includes an elongated movable trigger 10, disposed within a somewhat cylindrical and elongated, non linear nipple 12 having a front end and a valve end and which engages the valve housing 14, together with a flow regulating screw seat 17 and flow regulating screw 18.

Now referring to FIG. 2A there is shown a front view of the nipple 12 with trigger 10 disposed therein.

Now referring to FIG. 2B there is shown the waterer of this invention. The nipple 12 is clearly shown to be non linear and having a downward bend near the front end.

Now referring to FIG. 3A there is a cross sectional view of the nipple 12 and trigger 10 disposed therein taken on line 3A-3A' of FIG. 2B. The trigger 10 is shown essentially centered in nipple 12.

Now referring to FIG. 3B there is shown a cross sectional view of the nipple 12 and trigger 10 disposed therein taken on line 3B-3B' of FIG. 2B. The nipple 12 is shown as no longer centered about trigger 10, but in fact the nipple 12 is situated lower with respect to trigger 10. The distance 30 between the trigger 10 and bottom of nipple 12 is shown to be larger in comparison to FIG. 3A.

Now referring to FIG. 4A there is shown a cross sectional view of the waterer of this invention which more clearly shows the engagement between nipple 12 and valve housing 14 which is threaded inside of nipple 12 at its valve is threaded inside of nipple 12 at its valve end.

Now referring to FIG. 4B there is shown an enlarged view of the moving parts of the cross sectional view of FIG. 4A. The trigger 10 is shown having a slotted tip 46 for receiving a screwdriver blade. The trigger 10 extends through valve housing 14 where it may engage the small O-Ring 43. Trigger 10 has a slotted head 44 at the end opposite of the slotted tip 46. Spring 41 is positioned next to head 44 and within large O-ring 42 and extends into flow regulating screw seat 17 which is threaded into the valve housing 14. Extending through seat 17 and spring 41 if flow regulating screw 18. Screw 18 has a slotted head for receiving a screw driver and threads for engaging with seat 17, however, the threads do not extend completely around screw 18, there is a non threaded side 40 on each side of screw 18 which allows passage of fluid through seat 17 when screw 18 is in place.

Figure 4C:
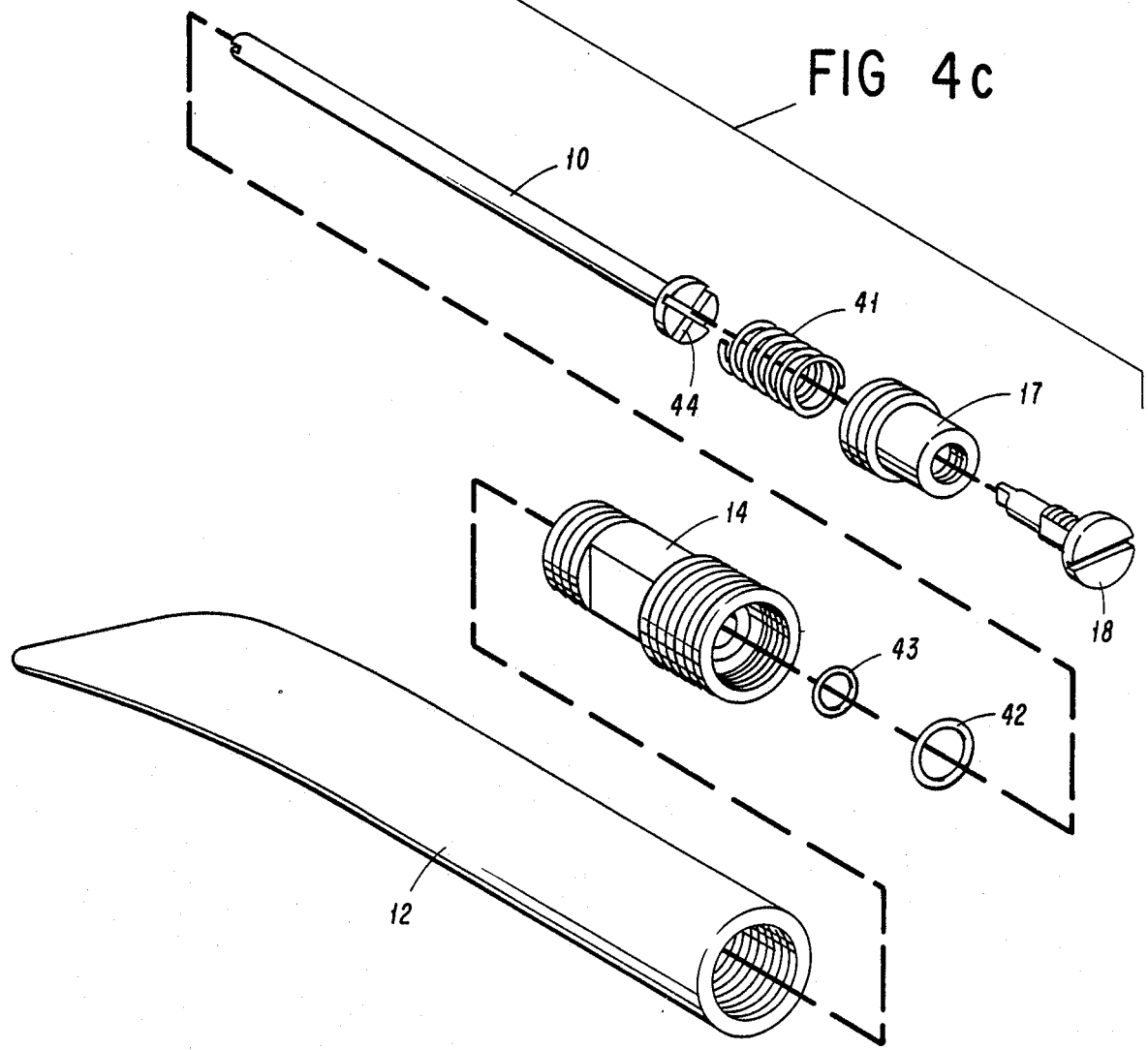
FIG. 4C is an exploded view of the waterer of this invention.

Now referring to FIG. 4C there is shown an exploded view the waterer of this invention. Flow regulating screw 18 with its tapered head partially threaded shank and screwdriver like blade tip is shown. Screw 18 is preferably stainless steel or any other material with similar or superior properties of strength and chemical inertness when in a water solution. The tapered head of screw 18 is designed to tightly seat with flow regulating screw seat 17. The partially threaded shank of screw 18 threads into seat 17, so that the gap between the tapered head of screw 18 and the seat 17 increases as the screw 18 is retracted from seat 17. (shown in FIGS. 4A-4B). Flow regulating screw seat 17 is preferably constructed of a polymeric or any material which is capable of seating tightly with the material chosen for screw 18. Seat 17 has exterior threads around its outside surface which are for engaging with the valve housing 14. Large O-ring 42 is situated within and seals valve housing 14 to seat 17. Helical spring 41 extends partially into seat 17 and surrounds the partially threaded shank and screw driver like tip of screw 18. Spring 41 is selected so that it can be compressed sufficiently to allow the slotted head 44 of trigger 10 to engage with the screw driver like blade of screw 18. Slotted head 44 of trigger 10 preferably has two perpendicular slots therein for receiving screw 18, and is preferable composed of stainless steel or any material having similar or superior qualities. Head 44 is kept in engagement with small O-ring 43 thereby precluding fluid flow in nipple 12 unless trigger 10 is perturbed and thereby causing a tilting of head 44 with respect to O-ring 43. If trigger 10 is sufficiently perturbed a gap through which fluid can flow will appear between head 44 and O-ring 43. The degree of perturbation of trigger 10 necessary to allow fluid flow depends largely upon the material which is chosen for small O-ring 43. The softer the materials chosen for Ring 43, the less perturbation of trigger 10 will be necessary for fluid flow to occur. Standard commerically available O-rings are preferred for rings 43 and 42 when trigger 10 is composed of a stainless steel alloy and valve housing 14 is chosen from a brass alloy. Valve housing 14 receives seat 17 and trigger 10 with its slotted head 44, housing 14 is composed of a material having a high coefficient of thermal conductivity with respect to the materials in nipple 12. When a stainless steel alloy is used for nipple 12, a brass alloy is preferred for housing 14. The water source (not shown) is engaged with housing 14 so that water is supplied around screw 18.

In operation, the nipple waterer of this invention is engaged with a water source which provides water around screw 18 and through the gap between screw 18 and seat 17. Normally water will not flow beyond the slotted head 44 and small O-ring 43 interface, however, if the trigger 10 is sufficiently perturbed then a gap between head 44 and one side of small O-ring 43 will appear. The water from the water source which passes between the flow regulating screw 18 and the flow regulating screw seat 17 will then pass through the nipple and be consumed by the animal. The flow rate, once the trigger is depressed, is determined by the relative proximity of the flow regulating screw 18 to the flow regulating screw seat 17. As the screw 18 is retracted from the seat 17 a larger gap therebetween allows a larger flow rate. The flow rate can be adjusted from the nipple end by inserting a screwdriver into the slotted tip 46 of trigger 10 and depressing the trigger 10 into the valve housing 14 so that a slot of the head 44 engages the screwdriver like blade of screw 18.

Two perpendicular slots in head 44 are used to limit the required pre-engagement rotation to 90° or less. More slots are possible, as are other configurations such as hexagonal key type couplers, phillips type screw driver head and driver, and others as are known in the art. The slot and blade configuration may readily by configured with the blade on either the trigger or metering screw, so long as the disengagement of the two components is allowed during normal operation.

The trigger then is rotated thereby rotating its attached head 44 which in turn rotates the screw 18. Rotating the trigger clockwise results in the screw 18 retracting from the seat 17 and thereby increasing the flow rate. An opposite rotation of the trigger 120 will reduce the flow rate.

An advantageous aspect of the present invention is the capacity to clean out the valve body 14 flushing, without removing the nipple. By adjusting the metering screw to a relatively wide open position, the water born contamination is flushed out the nipple end in a few seconds. Thereafter the valve is adjusted back to the desired flow rate and will not have contamination caused leakage.

The nipple waterer of this invention and many of its attendant advantages will be readily understood from the foregoing description, and it will be apparent that various changes may be made in form, construction, and arrangement of the parts thereof without departing from the spirit and scope of the invention or sacrificing all of its material advantages, the form herein before described being merely a preferred or exemplary embodiment thereof.

We claim:

1. An animal watering apparatus, of the type having a maximum flow rate which is adjustable by a stockman, comprising:
   a. first rotary valving means for controlling flow rate, which is capable of allowing separate selective regulation, by the stockman, of the maximum flow rate through the watering apparatus, by the stockman setting a variable maximum flow rate which is independent of the normal on-off operation of the watering apparatus;
   b. a valve body for housing said first rotary valving means;
   c. second valving means additionally housed in said valve body for on-off control of the animal watering apparatus; and
   d. means for selectively engaging, by the stockman, said second valving means with said first rotary valving means for adjusting said flow rate by selectively manipulating said second valving means, while allowing normal on-off operation otherwise independent of said maximum flow rate.

2. An apparatus of claim 1 wherein said valve body has a high thermal conductivity in comparison to said first valving means and said second valving means.

3. A nipple waterer for providing drinking water to animals, which has a maximum flow rate selectable by a stockman, comprising in operative combination:
   a. a first valve having a trigger means which is actuable by an animal,
   b. an adjustable maximum flow regulating valve in proximity to said first valve for regulating, by the stockman, the maximum flow rate through said first valve;
   c. said trigger means selectively engageable with said adjustable maximum flow regulating valve so that a selective manipulation, by the stockman, of said trigger results in an adjustment to said adjustable maximum flow regulating valve.

4. A waterer of claim 3 wherein said adjustable maximum flow regulating valve further comprises:
   a. a flow regulating screw having threads thereon with a non-threaded side for allowing the passage of water, a tapered head and a blade tip;
   b. a flow regulating screw seat for receiving said screw and engaging said tapered head.

5. A waterer of claim 4 wherein said trigger means further comprises an elongated shaft having a slotted tip end a slotted valve head end on opposite ends.

6. A waterer of claim 5 wherein said first valve further comprises:
   a. a valve housing having an aperture therethrough for receiving said shaft and allowing fluid flow;
   b. a valve seat located in said valve housing an disposed about said aperture,
   c. a resilient seal member positioned around said shaft and between said valve seat and said valve head.

7. A waterer of claim 6 further comprising:
   a. a helical spring disposed between said slotted valve head and said screw seat;
   b. said helical spring being capable of being compressed so that said slotted valve head can be made to engage said blade tip of said screw.

8. A waterer of claim 7 wherein said first valve further comprises a bent cylinder engaging said valve housing and surrounding said shaft.

9. A waterer of claim 8 further comprising said valve housing having a thermal conductivity coefficient larger than that said cylinder and said flow regulating valve.

10. A watering apparatus for dispensing drinking water for consumption by livestock comprising in operative combination:
    (a) a valve housing, having a water inlet end and a water outlet end;
    (b) an adjustable maximum flow rate valve disposed within the valve housing at the water inlet end, for regulating the maximum flow rate of water through the valve housing;
    (c) a triggering valve disposed within the valve housing at the water outlet end for allowing water flow out the water outlet end in response to manipulations from the livestock;
    (d) means for selectively engaging the triggering valve with the adjustable flow rate valve and thereby regulating the maximum flow through the adjustable maximum flow rate valve in response to selective manipulations of the triggering valve; whereby, the livestock can manipulate the triggering valve and thereby allow water flow to occur at a variable predetermined rate which is adjustable by selectively engaging and manipulating the triggering valve with the adjustable maximum flow rate valve.

11. An apparatus of claim 10 wherein said means for selectively engaging further comprises: a resilient member disposed between the triggering valve and adjustable flow rate valve.

12. An apparatus of claim 11 wherein said resilient member is a helical spring.

* * * * *